US012787001B2

(12) United States Patent
Yuan et al.

(10) Patent No.: US 12,787,001 B2
(45) Date of Patent: Nov. 3, 2026

(54) SELECTION OF DEFAULT PATH LOSS REFERENCE SIGNAL OR DEFAULT SPATIAL RELATION

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 18/556,035

(22) PCT Filed: Jul. 2, 2021

(86) PCT No.: PCT/CN2021/104347
§ 371 (c)(1),
(2) Date: Oct. 18, 2023

(87) PCT Pub. No.: WO2023/272735
PCT Pub. Date: Jan. 5, 2023

(65) Prior Publication Data
US 2024/0224277 A1 Jul. 4, 2024

(51) Int. Cl.
*H04W 72/1273* (2023.01)
*H04B 7/06* (2006.01)
(Continued)

(52) U.S. Cl.
CPC .... *H04W 72/1273* (2013.01); *H04B 7/06968* (2023.05); *H04L 5/0051* (2013.01);
(Continued)

(58) Field of Classification Search
CPC ............. H04W 72/1273; H04W 72/02; H04W 72/0457; H04W 76/20; H04B 7/06968;
(Continued)

(56) References Cited

U.S. PATENT DOCUMENTS

| | | | | |
|---|---|---|---|---|
| 11,909,465 | B2 * | 2/2024 | Matsumura | H04W 16/28 |
| 11,937,098 | B2 * | 3/2024 | Zhang | H04B 7/022 |

(Continued)

FOREIGN PATENT DOCUMENTS

| | | | |
|---|---|---|---|
| WO | WO-2018171425 | A1 | 9/2018 |
| WO | WO-2021026683 | A1 | 2/2021 |

OTHER PUBLICATIONS

International Search Report and Written Opinion—PCT/CN2021/104347—ISA/EPO—Mar. 28, 2022.

(Continued)

*Primary Examiner* — Sai Aung
*Assistant Examiner* — Wilfred Thomas
(74) *Attorney, Agent, or Firm* — Harrity & Harrity LLP/ QUALCOMM Incorporated

(57) ABSTRACT

Various aspects of the present disclosure generally relate to wireless communication. In some aspects, a user equipment (UE) may select, as a default path loss reference signal (PLRS), a reference signal (RS) resource that corresponds to an active physical downlink shared channel (PDSCH) transmission configuration indicator (TCI) state of an active downlink (DL) bandwidth part (BWP) if a control resource set (CORESET) is not provided in the active DL BWP. The UE may receive the default PLRS. In some aspects, the UE may select, as a default spatial relation for a physical uplink control channel (PUCCH) communication, a spatial relation that corresponds to an active PDSCH TCI state of an active DL BWP if a CORESET is not provided in the active DL BWP. The UE may receive the PUCCH communication using a TCI state that corresponds to the default spatial relation. Numerous other aspects are described.

18 Claims, 13 Drawing Sheets

(51) Int. Cl.

| | |
|---|---|
| ***H04L 5/00*** | (2006.01) |
| ***H04W 72/02*** | (2009.01) |
| ***H04W 72/0457*** | (2023.01) |
| ***H04W 76/20*** | (2018.01) |

(52) U.S. Cl.

CPC ....... *H04W 72/02* (2013.01); *H04W 72/0457* (2023.01); *H04W 76/20* (2018.02)

(58) Field of Classification Search

CPC ................. H04L 5/0051; H04L 5/0023; H04L 5/0053; H04L 5/0094; H04L 5/0048

See application file for complete search history.

(56) References Cited

U.S. PATENT DOCUMENTS

| | | | | |
|---|---|---|---|---|
| 2019/0149380 | A1* | 5/2019 | Babaei | H04W 72/23 370/330 |
| 2019/0296805 | A1 | 9/2019 | Son | |
| 2022/0086769 | A1* | 3/2022 | Guo | H04W 52/242 |
| 2022/0321292 | A1* | 10/2022 | Matsumura | H04L 5/0048 |
| 2022/0330163 | A1* | 10/2022 | Liu | H04W 52/34 |
| 2022/0345903 | A1* | 10/2022 | Liu | H04W 16/28 |
| 2024/0015740 | A1* | 1/2024 | Xiao | H04W 72/1273 |
| 2024/0056960 | A1* | 2/2024 | Axmon | H04W 48/20 |
| 2024/0121623 | A1* | 4/2024 | Matsumura | H04W 72/1273 |
| 2024/0267175 | A1* | 8/2024 | Matsumura | H04B 7/024 |
| 2024/0291594 | A1* | 8/2024 | Zhang | H04L 5/0096 |

OTHER PUBLICATIONS

Nokia et al., "Maintenance of Rel-16 Beam Management", 3GPP TSG RAN WG1 #100bis, R1-2002295, Apr. 30, 2020 (Apr. 30, 2020), 8 Pages, Sections 2.3-2.4.

Nokia, et al., "Maintenance of Rel-16 Beam Management," 3GPP TSG RAN WG1 #100, R1-2000989, e-meeting, Feb. 18-Mar. 6, 2020, (Jun. 3, 2020), sections 1-3, 5 pages.

Nttdocomo Inc., "Discussion on Multi-Beam Operation", 3GPP TSG RAN WG1 #104bis-e, R1-2103559, Apr. 20, 2021 (Apr. 20, 2021), 20 Pages, Section 7.2.

ZTE: "Multi-TRP Enhancements for PDCCH, PUCCH and PUSCH", 3GPP TSG RAN WG1 Meeting #104b-e, R1-2102661, Apr. 20, 2021 (Apr. 20, 2021), 27 Pages, The Whole Document.

* cited by examiner

SELECTION OF DEFAULT PATH LOSS REFERENCE SIGNAL OR DEFAULT SPATIAL RELATION

CROSS-REFERENCE TO RELATED APPLICATION

This Patent Application is a 371 national stage of PCT Application No. PCT/CN2021/104347, filed on Jul. 2, 2021, entitled "SELECTION OF DEFAULT PATH LOSS REFERENCE SIGNAL OR DEFAULT SPATIAL RELATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for selecting a default path loss reference signal or a default spatial relation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include selecting, as a default path loss reference signal (PLRS), a reference signal (RS) resource that corresponds to an active physical downlink shared channel (PDSCH) transmission configuration indicator (TCI) state of an active downlink (DL) bandwidth part (BWP) if the UE does not receive an indication of a PLRS and if a control resource set (CORESET) is not provided in the active DL BWP. The method may include receiving the default PLRS in association with a physical uplink control channel (PUCCH).

Some aspects described herein relate to a method of wireless communication performed by a base station. The method may include selecting, as a default PLRS for a UE, an RS resource that corresponds to a PDSCH TCI state of an active DL BWP for the UE if the base station does not provide an indication of a PLRS to the UE and if the base station does not provide the UE a CORESET in the active DL BWP. The method may include transmitting the RS resource to the UE as the default PLRS.

Some aspects described herein relate to a method of wireless communication performed by a UE. The method may include selecting, as a default spatial relation for a PUCCH communication, a spatial relation that corresponds to a PDSCH TCI state of an active DL BWP if the UE does not receive spatial relation information and if a CORESET is not provided in the active DL BWP. The method may include transmitting the PUCCH communication using the spatial relation.

Some aspects described herein relate to a method of wireless communication performed by a base station. The method may include selecting, as a default spatial relation for a PUCCH communication, a spatial relation that corresponds to a PDSCH TI state of an active DL BWP if the base station does not provide spatial relation information for the PUCCH and if the base station does not provide a CORESET in the active DL BWP. The method may include receiving the PUCCH communication using a TCI state that corresponds to the default spatial relation.

Some aspects described herein relate to a UE for wireless communication. The user equipment may include a memory and one or more processors coupled to the memory. The one or more processors may be configured to select, as a default PLRS, an RS resource that corresponds to a PDSCH TCI state of an active DL BWP if the UE does not receive an indication of a PLRS and if a CORESET is not provided in the active DL BWP. The one or more processors may be configured to receive the default PLRS in association with a PUCCH.

Some aspects described herein relate to a base station for wireless communication. The base station may include a memory and one or more processors coupled to the memory. The one or more processors may be configured to select, as a default PLRS for a UE, an RS resource that corresponds to a PDSCH TCI state of an active DL BWP for the UE if the base station does not provide an indication of a PLRS to the UE and if the base station does not provide the UE a CORESET in the active DL BWP. The one or more processors may be configured to transmit the RS resource to the UE as the default PLRS.

Some aspects described herein relate to a UE for wireless communication. The user equipment may include a memory and one or more processors coupled to the memory. The one or more processors may be configured to select, as a default spatial relation for a PUCCH communication, a spatial relation that corresponds to a PDSCH TCI state of an active DL BWP if the UE does not receive spatial relation information and if a CORESET is not provided in the active DL BWP. The one or more processors may be configured to transmit the PUCCH communication using the spatial relation.

Some aspects described herein relate to a base station for wireless communication. The base station may include a memory and one or more processors coupled to the memory. The one or more processors may be configured to select, as a default spatial relation for a PUCCH communication, a spatial relation that corresponds to a PDSCH TCI state of an active DL BWP if the base station does not provide spatial relation information for the PUCCH and if the base station does not provide a CORESET in the active DL BWP. The one or more processors may be configured to receive the PUCCH communication using a TCI state that corresponds to the spatial relation.

Some aspects described herein relate to a non-transitory computer-readable medium that stores a set of instructions for wireless communication by a UE. The set of instructions, when executed by one or more processors of the UE, may cause the UE to select, as a default PLRS, an RS resource that corresponds to a PDSCH TCI state of an active DL BWP if the UE does not receive an indication of a PLRS and if a CORESET is not provided in the active DL BWP. The set of instructions, when executed by one or more processors of the UE, may cause the UE to receive the default PLRS in association with a PUCCH.

Some aspects described herein relate to a non-transitory computer-readable medium that stores a set of instructions for wireless communication by a base station. The set of instructions, when executed by one or more processors of the base station, may cause the base station to select, as a default PLRS for a UE, an RS resource that corresponds to a PDSCH TCI state of an active DL BWP for the UE if the base station does not provide an indication of a PLRS to the UE and if the base station does not provide the UE a CORESET in the active DL BWP. The set of instructions, when executed by one or more processors of the base station, may cause the base station to transmit the RS resource to the UE as the default PLRS.

Some aspects described herein relate to a non-transitory computer-readable medium that stores a set of instructions for wireless communication by a UE. The set of instructions, when executed by one or more processors of the UE, may cause the UE to select, as a default spatial relation for a PUCCH communication, a spatial relation that corresponds to a PDSCH TCI state of an active DL BWP if the UE does not receive spatial relation information and if a CORESET is not provided in the active DL BWP. The set of instructions, when executed by one or more processors of the UE, may cause the UE to transmit the PUCCH communication using the spatial relation.

Some aspects described herein relate to a non-transitory computer-readable medium that stores a set of instructions for wireless communication by a base station. The set of instructions, when executed by one or more processors of the base station, may cause the base station to select, as a default spatial relation for a PUCCH communication, a spatial relation that corresponds to a PDSCH TCI state of an active DL BWP if the base station does not provide spatial relation information for the PUCCH and if the base station does not provide a CORESET in the active DL BWP. The set of instructions, when executed by one or more processors of the base station, may cause the base station to receive the PUCCH communication using a TCI state that corresponds to the default spatial relation.

Some aspects described herein relate to an apparatus for wireless communication. The apparatus may include means for selecting, as a default PLRS, an RS resource that corresponds to a PDSCH TCI state of an active DL BWP if the apparatus does not receive an indication of a PLRS and if a CORESET is not provided in the active DL BWP. The apparatus may include means for receiving the default PLRS in association with a PUCCH.

Some aspects described herein relate to an apparatus for wireless communication. The apparatus may include means for selecting, as a default PLRS for a UE, an RS resource that corresponds to a PDSCH TCI state of an active DL BWP for the UE if the apparatus does not provide an indication of a PLRS to the UE and if the apparatus does not provide the UE a CORESET in the active DL BWP. The apparatus may include means for transmitting the RS resource to the UE as the default PLRS.

Some aspects described herein relate to an apparatus for wireless communication. The apparatus may include means for selecting, as a default spatial relation for a PUCCH communication, a spatial relation that corresponds to a PDSCH TCI state of an active DL BWP if the apparatus does not receive spatial relation information and if a CORESET is not provided in the active DL BWP. The apparatus may include means for transmitting the PUCCH communication using the spatial relation.

Some aspects described herein relate to an apparatus for wireless communication. The apparatus may include means for selecting, as a default spatial relation for a PUCCH communication, a spatial relation that corresponds to a PDSCH TCI state of an active DL BWP if the apparatus does not provide spatial relation information for the PUCCH and if the apparatus does not provide a CORESET in the active DL BWP. The apparatus may include means for receiving the PUCCH communication using a TCI state that corresponds to the default spatial relation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
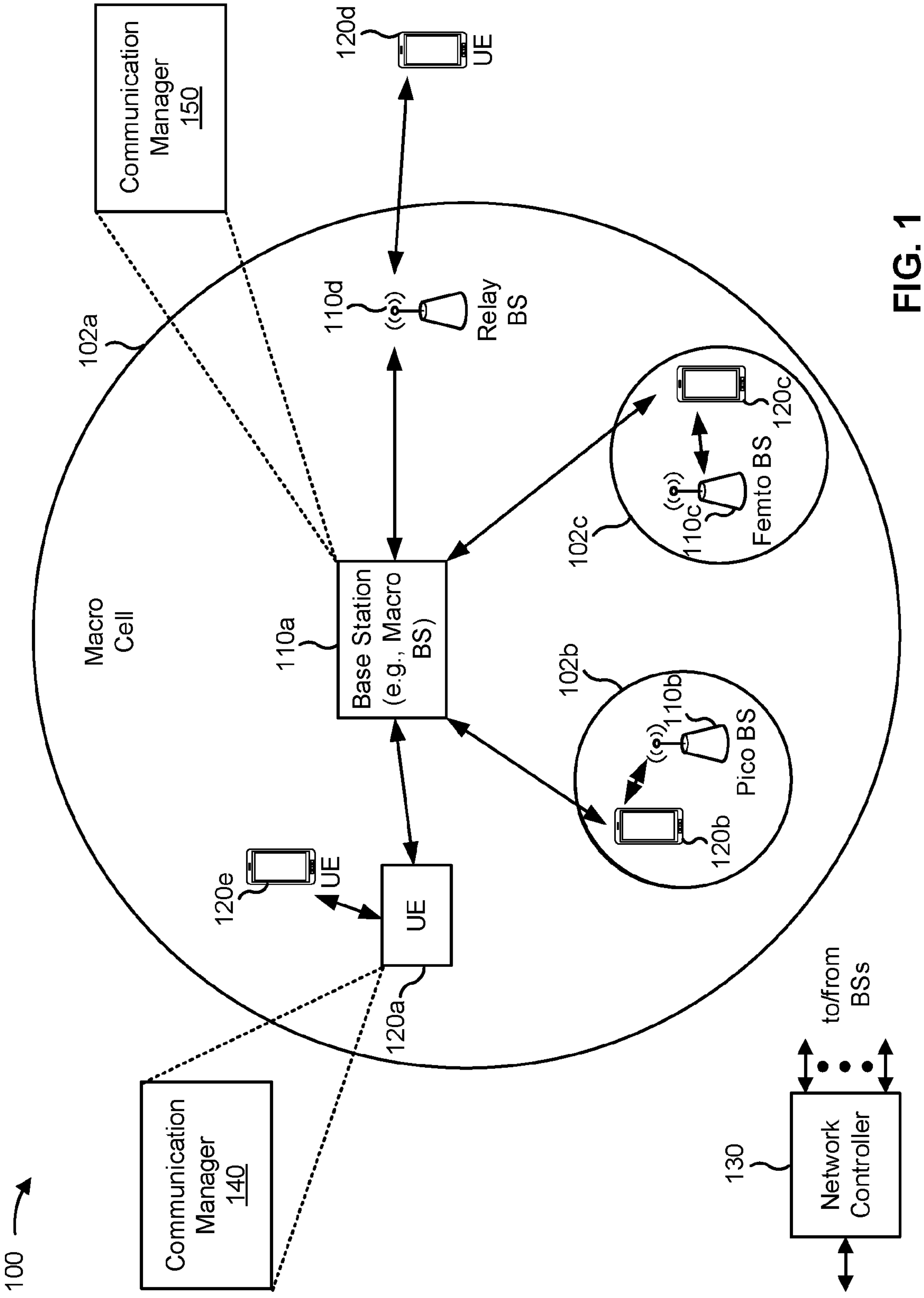
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may select, as a default path loss reference signal (PLRS), a reference signal (RS) resource that corresponds to an active physical downlink shared channel (PDSCH) transmission configuration indicator (TCI) state of an active downlink (DL) bandwidth part (BWP) if the UE does not receive an indication of a PLRS and if a control resource set (CORESET) is not provided in the active DL BWP. The communication manager 140 may receive the default PLRS in association with a physical uplink control channel (PUCCH). Additionally, or alternatively, the communication manager 140 may perform one or more other operations described herein.

In some aspects, the base station 110 may include a communication manager 150. As described in more detail elsewhere herein, the communication manager 150 may select, as a default PLRS for a UE, an RS resource that corresponds to an active PDSCH TCI state of an active DL BWP for the UE if the base station does not provide an indication of a PLRS to the UE and if the base station does not provide the UE a CORESET in the active DL BWP. The communication manager 150 may transmit the RS resource to the UE as the default PLRS. Additionally, or alternatively, the communication manager 150 may perform one or more other operations described herein.

In some aspects, the UE 120 may include a communication manager 140. As described in more detail elsewhere herein, the communication manager 140 may select, as a default spatial relation for a PUCCH communication, a spatial relation that corresponds to an active PDSCH TCI state of an active DL BWP if the UE does not receive spatial relation information and if a CORESET is not provided in the active DL BWP. The communication manager 150 may transmit the PUCCH communication using the spatial relation. Additionally, or alternatively, the communication manager 140 may perform one or more other operations described herein.

In some aspects, the base station 110 may include a communication manager 150. As described in more detail elsewhere herein, the communication manager 150 may select, as a default spatial relation for a PUCCH communication, a spatial relation that corresponds to an active PDSCH TCI state of an active DL BWP if the base station does not provide spatial relation information for the PUCCH and if the base station does not provide a CORESET in the active DL BWP. The communication manager 150 may receive the PUCCH communication using a TCI state that corresponds to the default spatial relation. Additionally, or alternatively, the communication manager 150 may perform one or more other operations described herein.

As indicated above, FIG. 1 is provided as an example. Other examples may differ from what is described with regard to FIG. 1.

Figure 2:
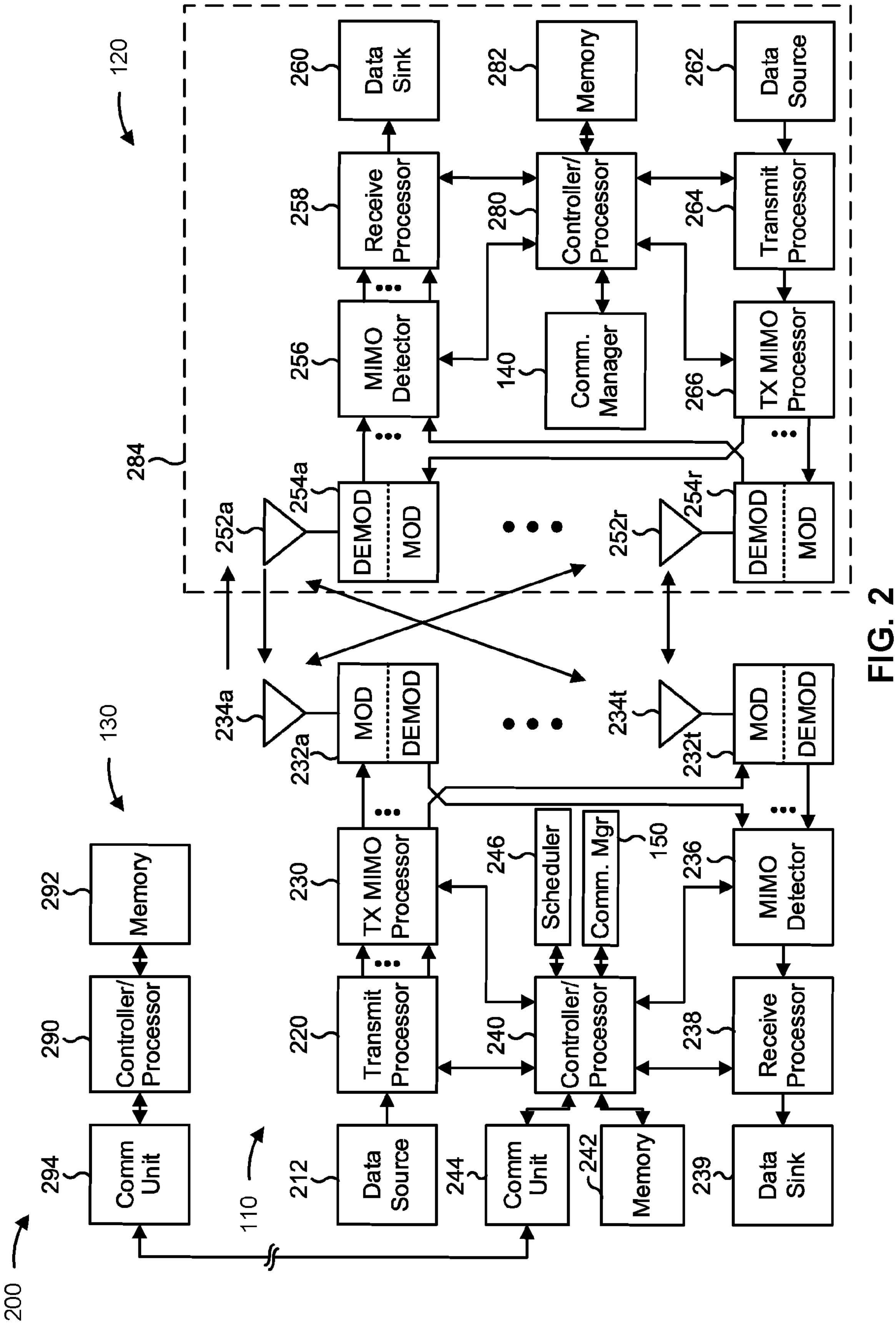
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 1-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 1-13).

The controller/processor 240 of the base station 110, the controller/processor 280 of the UE 120, and/or any other component(s) of FIG. 2 may perform one or more techniques associated with selecting a default PLRS or a default spatial relation if no CORESET is provided, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for selecting, as a default PLRS, an RS resource that corresponds to an active PDSCH TCI state of an active DL BWP if the UE 120 does not receive an indication of a PLRS and if a CORESET is not provided in the active DL BWP (e.g., using controller/processor 280, memory 282); and/or means for receiving the default PLRS in association with a PUCCH (e.g., using antenna 252, modem 254, MIMO detector 256, receive processor 258, controller/processor 280, memory 282). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for selecting, as a default PLRS for a UE, an RS resource that corresponds to an active PDSCH TCI state of an active DL BWP for the UE if the base station 110 does not provide an indication of a PLRS to the UE and if the base station does not provide the UE a CORESET in the active DL BWP (e.g., using controller/processor 240, memory 242); and/or means for transmitting the RS resource to the UE as the default PLRS (e.g., using controller/processor 240, transmit processor 220, TX MIMO processor 230, modem 232, antenna 234, memory 242). The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for selecting, as a default spatial relation for a PUCCH communication, a spatial relation that corresponds to an active PDSCH TCI state of an active DL BWP if the UE does not receive spatial relation information and if a CORESET is not provided in the active DL BWP (e.g., using controller/processor 280, memory 282); and/or means for transmitting the PUCCH communication using the spatial relation (e.g., using controller/processor 280, transmit processor 264, TX MIMO processor 266, modem 254, antenna 252, memory 282). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for selecting, as a default spatial relation for a PUCCH communication, a spatial relation that corresponds to an active PDSCH TCI state of an active DL BWP if the base station does not provide spatial relation information for the PUCCH and if the base station does not provide a CORESET in the active DL BWP (e.g., using controller/processor 240, memory 242); and/or means for receiving the PUCCH communication using a TCI state that corresponds to the default spatial relation (e.g., using antenna 234, modem 232, MIMO detector 236, receive processor 238, controller/processor 240, memory 242). The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
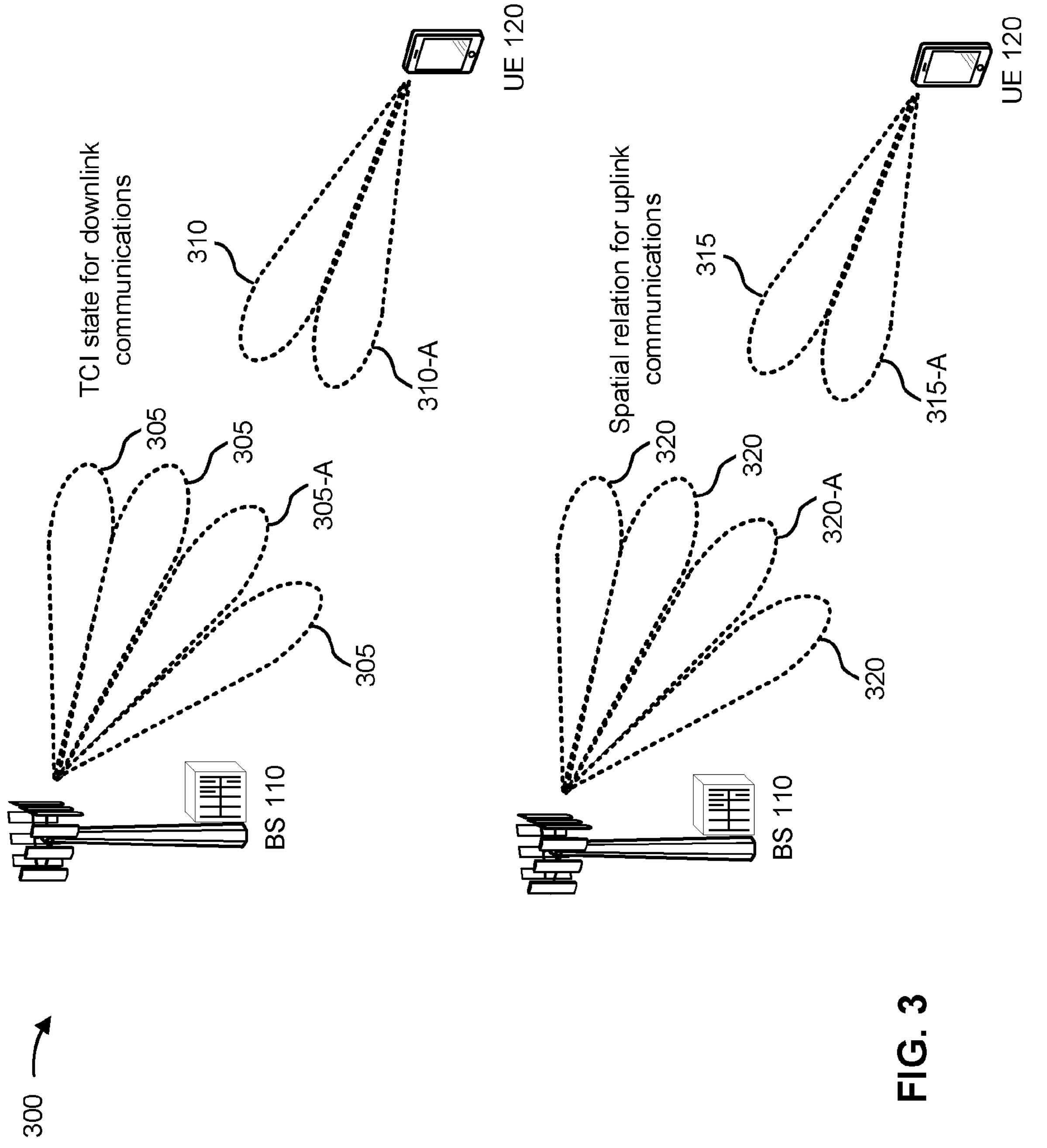
FIG. 3 is a diagram illustrating an example of using beams for communications between a base station and a UE, in accordance with the present disclosure.

FIG. 3 is a diagram illustrating an example 300 of using beams for communications between a base station and a UE, in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam identifier (ID), beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a physical downlink control channel (PDCCH) or in CORESET. The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

In some aspects, the base station 110 may transmit a PLRS that the UE 120 measures to determine a quality of a beam. The PLRS may be one of multiple RS resources that are each identified with an RS resource index. The quality of the beam may be used for beam selection. For example, the UE 120 may select a spatial relation that corresponds to the TCI state by which the PLRS is transmitted.

The UE 120 may receive an indication of a PLRS to use. If the UE 120 does not receive an indication of the PLRS to use, the UE 120 may select a default PLRS. The UE may select an RS resource that provides a periodic RS resource that is configured with a QCL-Type D in a TCI state or a QCL assumption of a CORESET that is provided in an active DL BWP of the serving cell.

The CORESET may be a potential control region that is structured to support an efficient use of resources and may occupy the first one, two, or three symbols of a slot. Thus, the CORESET may include multiple resource blocks (RBs) in the frequency domain and either one, two, or three symbols in the time domain. A symbol that includes the CORESET may include one or more control channel elements (CCEs) that span a portion of the system bandwidth. A CCE may include downlink control information (DCI) that is used to provide control information for wireless communication.

A search space may include all possible locations (e.g., in time and/or frequency) where a PDCCH may be located. A CORESET may include one or more search spaces, such as a UE-specific search space, a group-common search space, and/or a common search space. A search space may indicate a set of CCE locations where a UE may find PDCCHs that can potentially be used to transmit control information to the UE. The set of all possible PDCCH locations at an aggregation level may be referred to as a search space. One or more search spaces across aggregation levels may be referred to as a search space (SS) set.

As indicated above, FIG. 3 is provided as an example. Other examples may differ from what is described with respect to FIG. 3.

Figure 4:
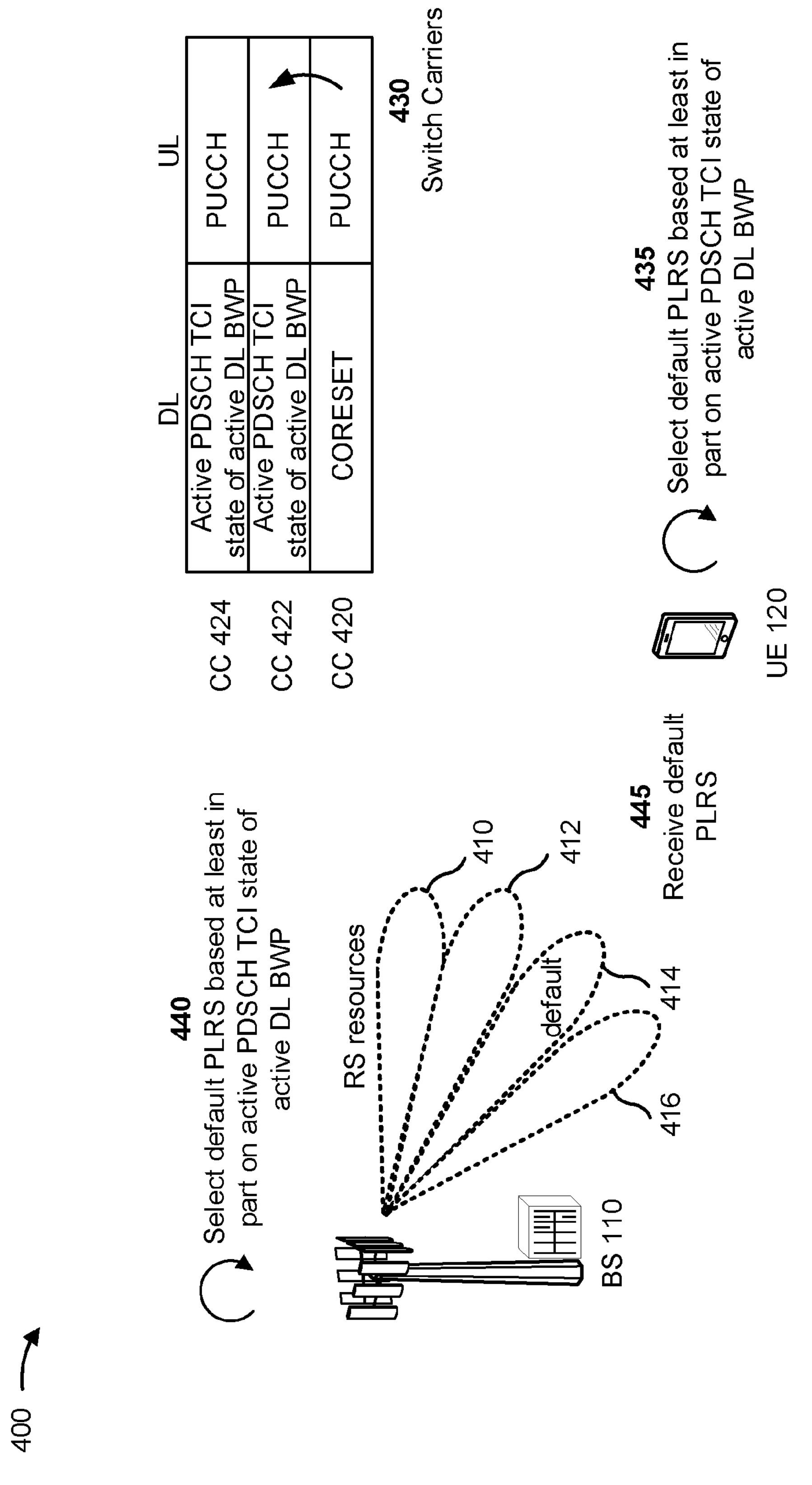
FIG. 4 is a diagram illustrating an example of selecting a default path loss reference signal, in accordance with the present disclosure.

FIG. 4 is a diagram illustrating an example 400 of selecting a default PLRS, in accordance with the present disclosure. As shown in FIG. 4, a base station 110 and a UE 120 may communicate with one another.

The UE 120 may be configured for PUCCH carrier switching. PUCCH carrier switching may involve the UE 120 switching from an original carrier to another carrier that may be one of multiple carriers used for PUCCH communications. The UE 120 may switch based on an indication in DCI that schedules a PUCCH communication or based on a semi-static configuration. The multiple carriers may be used for both PUCCH communications and corresponding downlink communications, such as PDCCH communications.

While the original carrier may be for a primary cell (PCell) or PUCCH-secondary cell (SCell) that is configured for PDCCH communications in a CORESET, other carriers may be for SCells that are not providing a CORESET. Therefore, when the UE 120 switches to the other carrier for PUCCH communications, the UE 120 may switch to a carrier for which there is no corresponding CORESET. This becomes an issue when the UE 120 is to use a default PLRS or a default beam (spatial relation). For example, when the UE 120 is with the original carrier that provides a CORESET, the UE 120 may select a default PLRS if the UE 120 has not been provided a PLRS in RRC parameter pathlossReferenceRSs and spatial relation information in RRC parameter PUCCH-SpatialRelationInfo, but has been configured to use a default beam (by RRC parameter enableDefaultBeamPlForPUCCH). The UE 120 may select the default PLRS with an RS resource index that provides a periodic RS resource with QCL Type D in the TCI state (or the QCL assumption) of a CORESET with a lowest index in the active DL BWP of the PCell or PUCCH-SCell. However, if the UE 120 switched carriers and there is no CORESET to indicate the RS resource for the default PLRS, the UE 120 may not know which RS resource to use as the default PLRS. As a result, the UE 120 may not measure a correct PLRS. This will lead to inaccurate path loss measurements that affect beam selection. If the UE 120 uses an insufficient or nonpreferred beam, the UE 120 and the base station 110 may waste processing resources and signaling resources with retransmissions for failed communications. Similarly, the UE 120 may use the CORESET for selecting a spatial setting for the PUCCH transmissions. If there is no CORESET provided due to a carrier switch for PUCCH communications, the UE 120 may not know which spatial relation to use for a default beam for the PUCCH communications.

According to various aspects described herein, the UE 120 may be configured to select a default PLRS even after a carrier switch for PUCCH communications. The UE 120 involved with PUCCH carrier switching may select a default PLRS if a CORESET is not provided for a carrier (e.g., component carrier, or SCell). If the UE 120 does not receive an indication of a PLRS and a CORESET is not provided, the UE 120 may select, as a default PLRS, an RS resource that corresponds to an active PDSCH TCI state of an active DL BWP. This selection may be made because UE 120 is operating in an active DL BWP of the serving cell and each carrier is configured with a TCI state for PDSCH communications. The UE 120 may then receive and measure the default PLRS. Therefore, no matter which carrier the UE 120 switches to for PUCCH communications, there will be a corresponding active PDSCH TCI state that the UE 120 may use to select the default PLRS. In some aspects, the UE 120 may use the active PDSCH TCI state with the lowest ID in the active DL BWP in the component carrier on which the PUCCH is switched. By selecting the default PLRS based at least in part on the active PDSCH TCI state in the active DL BWP, the base station 110 (using the same rule) and the UE 120 may coordinate path loss measurements and/or beam selection without explicit signaling. As a result, the base station 110 and the UE 120 may conserve processing resources and signaling resources while avoiding degraded communications.

Example 400 shows that UE 120 may select a default PLRS from among RS resource 410, RS resource 412, RS resource 414, or RS resource 416. The UE 120 may receive PUCCH communications originally on component carrier (CC) 420. CC 420 may provide a CORESET in the downlink that may be used for selecting a default PLRS. This is because CC 420 may be expected to be a PCell or a PUCCH-SCell that is configured with a CORESET. There may be other carriers, such as CC 422 and CC 424, that do not provide a CORESET, but are configured with an active PDSCH TCI state of an active DL BWP. As shown by reference number 430, the UE 120 may switch from CC 420 to CC 422.

The UE 120 may determine that a default PLRS is to be selected but the base station 110 has not indicated a PLRS in pathlossReferenceRSs and has not provided spatial relation information in PUCCH-SpatialRelationInfo, but the UE 120 has been configured to use a default beam (reflected by a parameter in enableDefaultBeamPlForPUCCH). As shown by reference number 435, the UE 120 may select, as the default PLRS, an RS resource based at least in part on an active PDSCH TCI state of an active DL BWP. For example, the UE 120 may select RS resource 414 as the default PLRS because RS resource 414 is associated with a TCI state that is used for PDSCH communications on CC 422. That is, the UE 120 may select RS resource 414 because RS resource 414 has an RS index that corresponds to the active PDSCH TCI state for CC 422, which may be the active PDSCH TCI state with the lowest ID in the active DL BWP. The UE 120 may alternatively select the active PDSCH TCI state with the highest ID or a designated ID. As shown by reference number 440, the base station 110 may use the same rule to select the default PLRS. In this way, the base station 110 may expect to transmit, and the UE 120 may expect to receive, the same default PLRS.

In some aspects, the UE 120 may select the default PLRS based at least in part on the active PDSCH TCI state in the active DL BWP if the UE 120 is not configured for multi-TRP. For example, the UE 120 may select the default PLRS based at least in part on the active PDSCH TCI state if: the UE 120 is provided a coresetPoolIndex value of 1 for all CORESETs, in ControlResourceSet with no codepoint of a TCI field, in a DCI format of any search space set that maps to two TCI states; or the UE 120 is not provided coresetPoolIndex value of 1 for any CORESET, or is provided coresetPoolIndex value of 1 for all CORESETs, in ControlResourceSet with no codepoint of a TCI field, in a DCI format of any search space set maps to two TCI states.

If the UE 120 is using CC 420 or another carrier where a CORESET is used or provided the active DL BWP of the serving cell, the UE 120 may select an RS index that corresponds to a periodic RS resource that is configured with QCL TypeD in a TCI state (or a QCL assumption) of a CORESET with the lowest index in the active DL BWP. That is, if a TCI state of a CORESET is available, the UE 120 may select an RS resource that is QCLed with the TCI state of the CORESET.

In some aspects, the UE 120 may select the RS resource that corresponds to a TCI state of a PLRS, a tracking reference signal (TRS), a CSI-RS, or some other reference signal. However, the UE 120 may use the active PDSCH TCI state, rather than other signals, because the active PDSCH TCI state may be more reliably found for each carrier and may involve less complexity.

As shown by reference number 445, the UE 120 may receive the default PLRS, which may be RS resource 414. The UE 120 may measure the default PLRS, select a new beam based on the measurement, and/or report PLRS measurements to the base station 110.

As indicated above, FIG. 4 is provided as an example. Other examples may differ from what is described with regard to FIG. 4.

Figure 5:
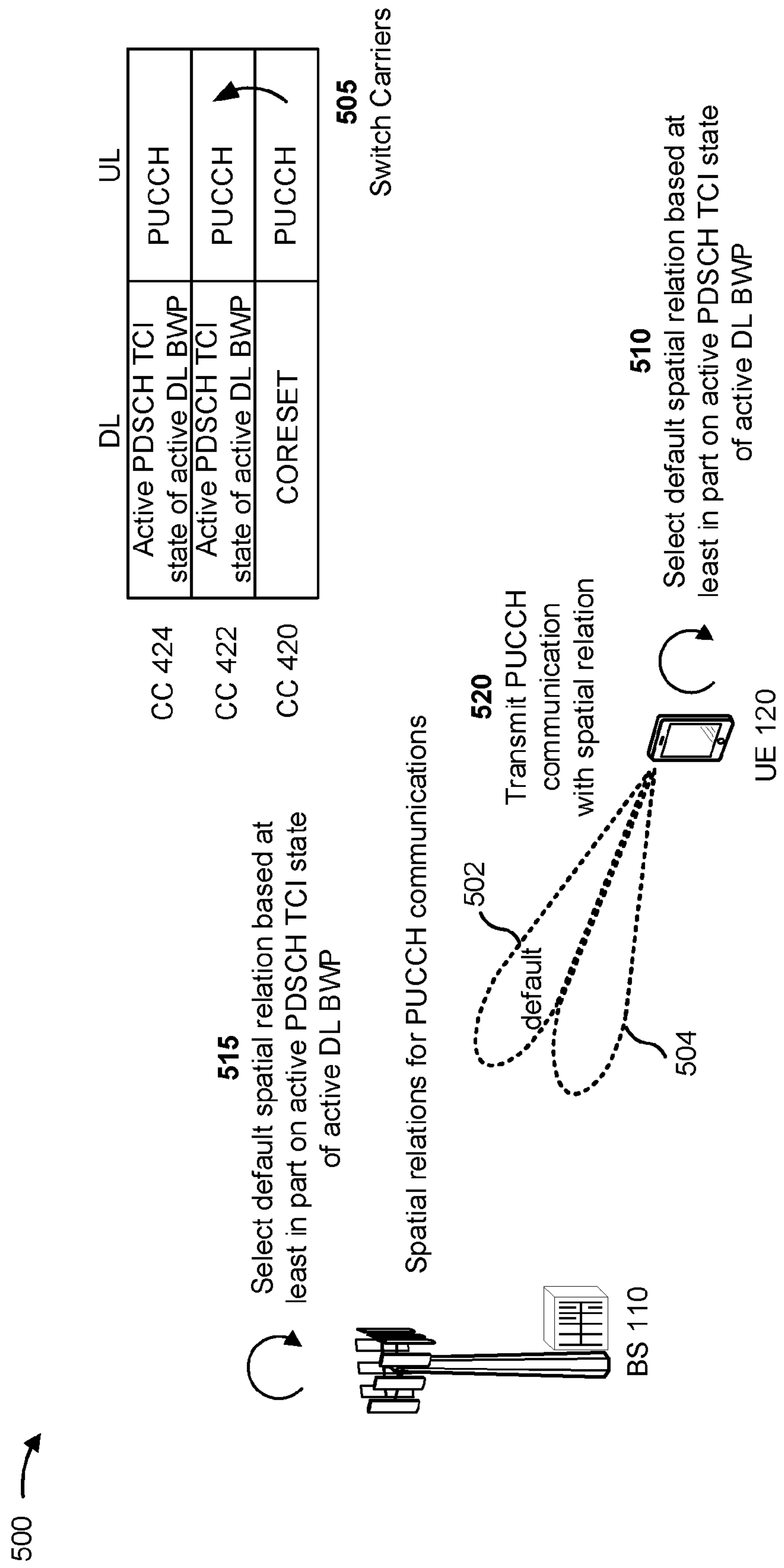
FIG. 5 is a diagram illustrating an example of selecting a default spatial relation, in accordance with the present disclosure.

FIG. 5 is a diagram illustrating an example 500 of selecting a default spatial relation, in accordance with the present disclosure. As shown in FIG. 5, a base station 110 and a UE 120 may communicate with one another.

In some aspects, if the UE 120 does not receive spatial relation information and a CORESET is not provided, the UE 120 may select, as a default spatial relation for a PUCCH communication, a spatial relation that corresponds to an active PDSCH TCI state of an active DL BWP. The UE 120 may use the active PDSCH TCI state with the lowest ID in the active DL BWP. By selecting the default spatial relation based at least in part on the active PDSCH TCI state in the active DL BWP, the base station 110 (which uses the same rule for selection) and the UE 120 may coordinate transmission and reception of the PUCCH communication. As a result, the base station 110 and the UE 120 may conserve processing resources and signaling resources with improved communications.

Example 500 shows that UE 120 may select a default spatial relation for a default beam from among spatial relation 502, spatial relation 504, or other spatial relations. The UE 120 may receive PUCCH communications originally on CC 420, but as shown by reference number 505, the UE 120 may switch from CC 420 to CC 422.

The UE 120 may determine that a default spatial relation is to be selected, but the base station 110 has not indicated a PLRS in pathlossReferenceRSs in power control field PUCCH-PowerControl and has not provided spatial relation information in RRC parameter PUCCH-SpatialRelationInfo. However, the UE 120 may have been configured to use a default beam (reflected by a RRC parameter in enableDefaultBeamPlForPUCCH). Based at least in part on these conditions, as shown by reference number 510, the UE 120 may select the default spatial relation based at least in part on an active PDSCH TCI state of an active DL BWP in the component carrier on which the PUCCH is switched. For example, the UE 120 may select spatial relation 502 as the default spatial relation because spatial relation 502 is associated with a TCI state that is used for PDSCH communications. In other words, the UE 120 may select spatial relation 502 because spatial relation 502 has an RS index that corresponds to the active PDSCH TCI state for CC 422, which may be the active PDSCH TCI state with the lowest ID in the active DL BWP. The UE 120 may alternatively select the active PDSCH TCI state with the highest ID or a designated ID. As shown by reference number 515, the base station 110 may use the same rule to select the default spatial relation. In this way, the UE 120 may expect to transmit a PUCCH communication with the default spatial relation, and the base station 110 may expect to receive the PUCCH communication using a TCI state that corresponds to the default spatial relation.

In some aspects, the UE 120 may select the default spatial relation based at least in part on the active PDSCH TCI state in the active DL BWP if the UE 120 is not configured for multi-TRP. For example, the UE 120 may select the default spatial relation based at least in part on the active PDSCH TCI state if the UE 120 is not provided coresetPoolIndex value of 1 for any CORESET, or is provided coresetPoolIndex value of 1 for all CORESETs, in ControlResourceSet with no codepoint of a TCI field, in a DCI format of any search space set maps to two TCI states.

If the UE 120 was using CC 420 or another carrier where a CORESET is used or provided the active DL BWP of the serving cell, the UE 120 may select a spatial relation that corresponds to a spatial relation or a spatial setting for PDCCH receptions by the UE 120 in a CORESET with the lowest index in the active DL BWP.

As shown by reference number 520, the UE 120 may transmit the PUCCH communication using a beam with the default spatial relation. The base station 110 may receive the PUCCH communication on the expected beam, without confusion as to which beam will be selected as a default beam.

As indicated above, FIG. 5 is provided as an example. Other examples may differ from what is described with regard to FIG. 5.

Figure 6:
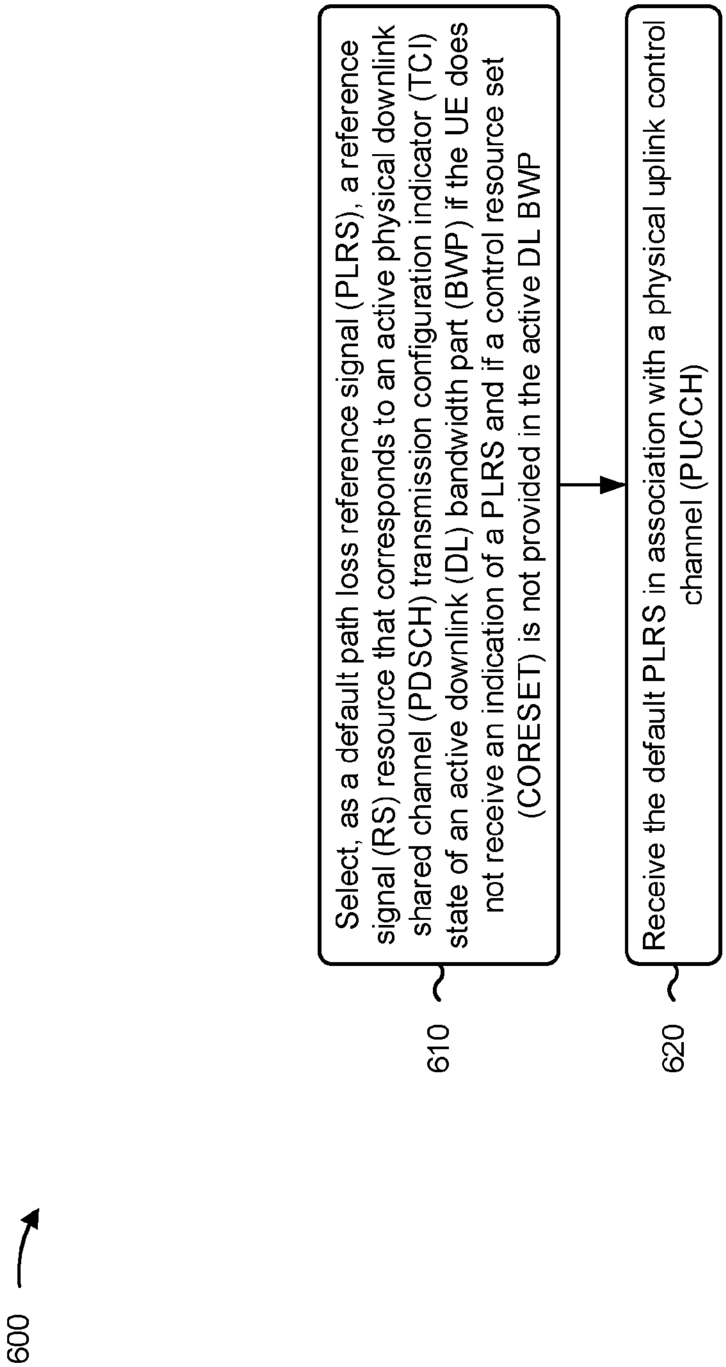
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with selecting a default PLRS if a CORESET is not provided.

As shown in FIG. 6, in some aspects, process 600 may include selecting, as a default PLRS, an RS resource that corresponds to an active PDSCH TCI state of an active DL BWP if the UE does not receive an indication of a PLRS and if a CORESET is not provided in the active DL BWP (block 610). That is, the default PLRS is selected when both conditions are met, i.e., when the UE does not receive an indication of a PLRS and when the CORESET is not provided in the active DL BWP. For example, the UE (e.g., using communication manager 140 and/or selection component 1010 depicted in FIG. 10) may select, as a default PLRS, an RS resource that corresponds to an active PDSCH TCI state of an active DL BWP if the UE does not receive an indication of a PLRS and if a CORESET is not provided in the active DL BWP, as described above, for example, with reference to FIGS. 3-4.

As further shown in FIG. 6, in some aspects, process 600 may include receiving the default PLRS in association with a PUCCH (block 620). For example, the UE (e.g., using communication manager 140 and/or reception component 1002 depicted in FIG. 10) may receive the default PLRS in association with a PUCCH, as described above, for example, with reference to FIGS. 3-4.

Process 600 may include additional aspects, such as any single aspect or any combination of aspects described below and/or in connection with one or more other processes described elsewhere herein.

In a first aspect, selecting the RS resource as the default PLRS includes selecting an RS resource index that provides a periodic RS resource that is configured with a QCL Type D in the active PDSCH TCI state.

In a second aspect, alone or in combination with the first aspect, selecting the RS resource as the default PLRS includes selecting an RS resource that corresponds to an active PDSCH TCI state with a lowest identifier in the active DL BWP.

In a third aspect, alone or in combination with one or more of the first and second aspects, the default PLRS is selected further if spatial relation information is not received for the PUCCH. That is, the default PLRS is selected when this condition and both of the conditions of block 610 are met, i.e., when the UE does not receive an indication of a PLRS, when the CORESET is not provided in the active DL BWP, and when spatial information is not received for the PUCCH (for the active DL BWP).

In a fourth aspect, alone or in combination with one or more of the first through third aspects, the default PLRS is selected further if the UE is configured to determine a default beam. That is, the default PLRS is selected when this condition, the condition of the third aspect, and both of the conditions of block 610 are met, i.e., when the UE does not receive an indication of a PLRS, when the CORESET is not provided in the active DL BWP, when spatial information for the active PDSCH TCI state is not received for the PUCCH, and when the UE is configured to determine a default beam.

In a fifth aspect, alone or in combination with one or more of the first through fourth aspects, process 600 includes switching carriers for the PUCCH.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
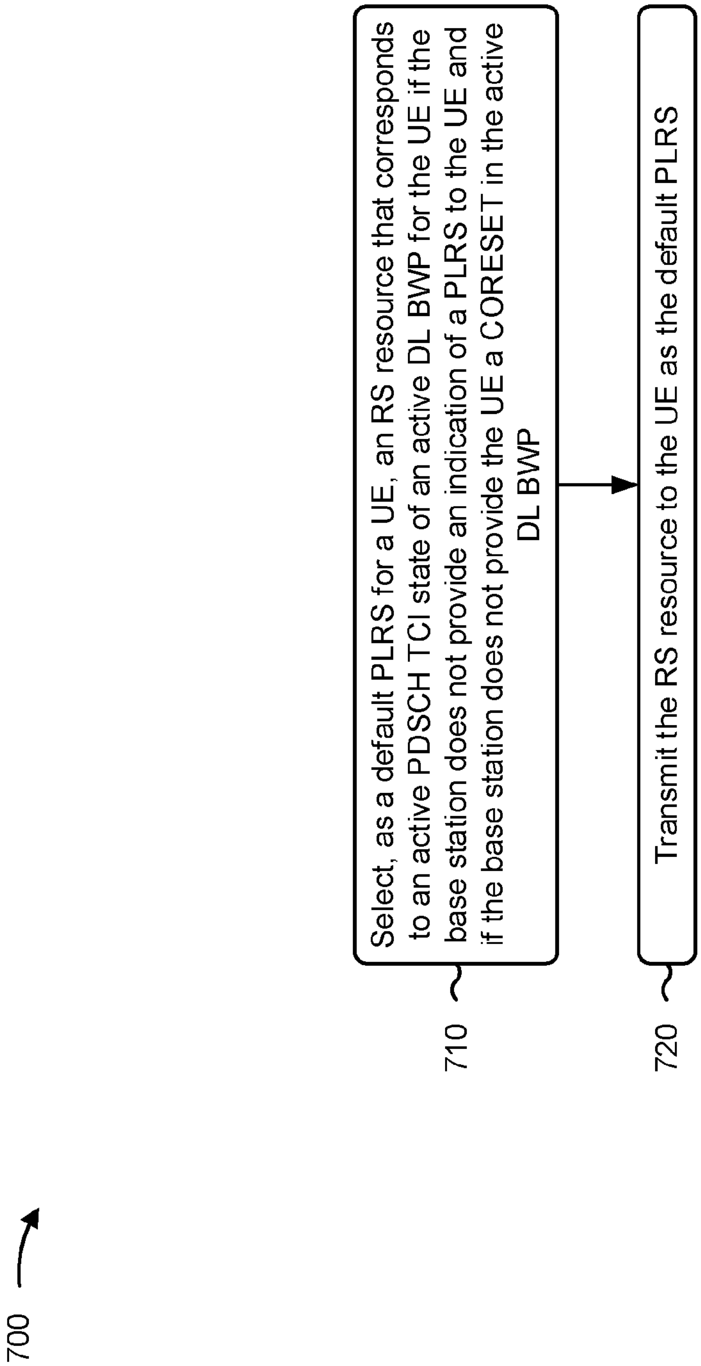
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) performs operations associated with selecting a default PLRS.

As shown in FIG. 7, in some aspects, process 700 may include selecting, as a default PLRS for a UE, an RS resource that corresponds to an active PDSCH TCI state of an active DL BWP for the UE if the base station does not provide an indication of a PLRS to the UE and if the base station does not provide the UE a CORESET in the active DL BWP (block 710). That is, the default PLRS is selected when both conditions are met, i.e., when the base station does not provide an indication of a PLRS to the UE and when the base station does not provide the UE a CORESET in the active DL BWP. For example, the base station (e.g., using communication manager 150 and/or selection component 1110 depicted in FIG. 11) may select, as a default PLRS for a UE, an RS resource that corresponds to an active PDSCH TCI state of an active DL BWP for the UE if the base station does not provide an indication of a PLRS to the UE and if the base station does not provide the UE a CORESET in the active DL BWP, as described above, for example, with reference to FIGS. 3-4.

As further shown in FIG. 7, in some aspects, process 700 may include transmitting the RS resource to the UE as the default PLRS (block 720). For example, the base station (e.g., using communication manager 150 and/or transmission component 1104 depicted in FIG. 11) may transmit the RS resource to the UE as the default PLRS, as described above, for example, with reference to FIGS. 3-4.

Process 700 may include additional aspects, such as any single aspect or any combination of aspects described below and/or in connection with one or more other processes described elsewhere herein.

In a first aspect, selecting the RS resource as the default PLRS includes selecting an RS resource index that provides the UE a periodic RS resource configured with a QCL Type D in the active PDSCH TCI state.

In a second aspect, alone or in combination with the first aspect, selecting the RS resource as the default PLRS includes selecting an RS resource that corresponds to an active PDSCH TCI state with a lowest identifier in the active DL BWP.

In a third aspect, alone or in combination with one or more of the first and second aspects, the default PLRS is selected further if spatial relation information is not provided to the UE for a PUCCH. That is, the default PLRS is selected when this condition and both of the conditions of block 710 are met, i.e., when the base station does not provide an indication of a PLRS to the UE, when the base station does not provide the UE a CORESET in the active DL BWP, and when spatial information is not provided to the UE for the PUCCH.

In a fourth aspect, alone or in combination with one or more of the first through third aspects, the default PLRS is selected further if the base station configured the UE to determine a default beam. That is, the default PLRS is selected when this condition, the condition of the third aspect, and both of the conditions of block 710 are met, i.e., when the base station does not provide an indication of a PLRS to the UE, when the base station does not provide the UE a CORESET in the active DL BWP, when spatial information is not provided to the UE for the PUCCH, and when the base station has configured the UE to determine a default beam.

In a fifth aspect, alone or in combination with one or more of the first through fourth aspects, process 700 includes configuring the UE for PUCCH carrier switching.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
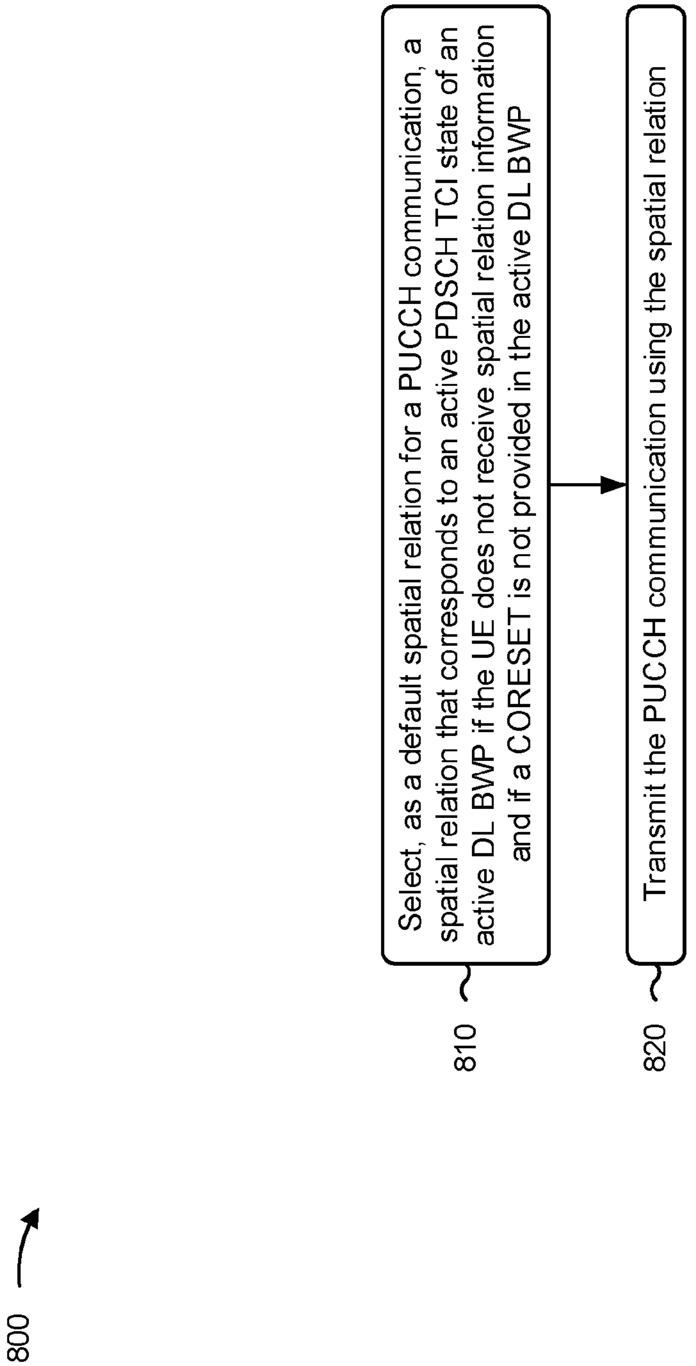
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with selecting a default spatial relation if a CORESET is not provided.

As shown in FIG. 8, in some aspects, process 800 may include selecting, as a default spatial relation for a PUCCH communication, a spatial relation that corresponds to an active PDSCH TCI state of an active DL BWP if the UE does not receive spatial relation information and if a CORESET is not provided in the active DL BWP (block 810). That is, the spatial relation is selected when both conditions are met, i.e., when the UE does not receive spatial relation information for the active PDSCH TCI state and when the CORESET is not provided in the active DL BWP. For example, the UE (e.g., using communication manager 140 and/or selection component 1210 depicted in FIG. 12) may select, as a default spatial relation for a PUCCH communication, a spatial relation that corresponds to an active PDSCH TCI state of an active DL BWP if the UE does not receive spatial relation information and if a CORESET is not provided in the active DL BWP, as described above, for example, with reference to FIGS. 3 and 5.

As further shown in FIG. 8, in some aspects, process 800 may include transmitting the PUCCH communication using the spatial relation (block 820). For example, the UE (e.g., using communication manager 140 and/or transmission component 1204 depicted in FIG. 12) may transmit the PUCCH communication using the spatial relation, as described above, for example, with reference to FIGS. 3 and 5.

Process 800 may include additional aspects, such as any single aspect or any combination of aspects described below and/or in connection with one or more other processes described elsewhere herein.

In a first aspect, selecting the spatial relation as the default spatial relation includes selecting a spatial relation that corresponds to an active PDSCH TCI state with a lowest identifier in the active DL BWP.

In a second aspect, alone or in combination with the first aspect, the default spatial relation is selected further if the UE is configured to determine a default beam. That is, the spatial relation is selected when this condition and both conditions of block 810 are met, i.e., when the UE does not receive spatial relation information for the active PDSCH TCI state, when the CORESET is not provided in the active DL BWP, and when the UE is configured to determine a default beam.

In a third aspect, alone or in combination with one or more of the first and second aspects, the default spatial relation is selected further if the UE does not receive an indication of a PLRS in a PUCCH power control field. That is, the spatial relation is selected when this condition, the condition of the second aspect, and both conditions of block 810 are met, i.e., when the UE does not receive spatial relation information for the active PDSCH TCI state, when the CORESET is not provided in the active DL BWP, when the UE is configured to determine a default beam, and when the UE does not receive an indication of a PLRS in a PUCCH power control field.

In a fourth aspect, alone or in combination with one or more of the first through third aspects, process 800 includes switching carriers for the PUCCH.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
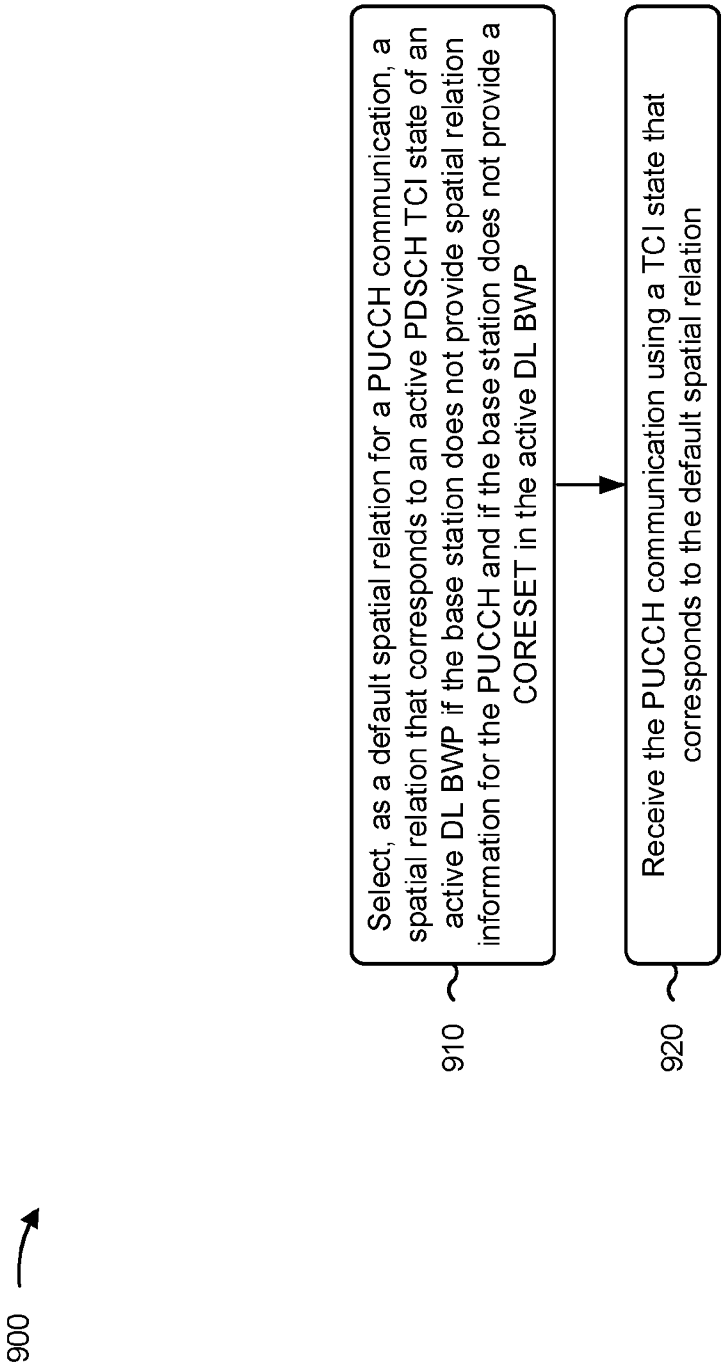
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110) performs operations associated with selecting a default spatial relation.

As shown in FIG. 9, in some aspects, process 900 may include selecting, as a default spatial relation for a PUCCH communication, a spatial relation that corresponds to an active PDSCH TCI state of an active DL BWP if the base station does not provide spatial relation information for the PUCCH and if the base station does not provide a CORESET in the active DL BWP (block 910). That is, the spatial relation is selected when both conditions are met, i.e., when the base station does not provide spatial relation information for the PUCCH and when the base station does not provide a CORESET in the active DL BWP. For example, the base station (e.g., using communication manager 150 and/or selection component 1310 depicted in FIG. 13) may select, as a default spatial relation for a PUCCH communication, a spatial relation that corresponds to an active PDSCH TCI state of an active DL BWP if the base station does not provide spatial relation information for the PUCCH and if the base station does not provide a CORESET in the active DL BWP, as described above, for example, with reference to FIGS. 3 and 5.

As further shown in FIG. 9, in some aspects, process 900 may include receiving the PUCCH communication using a TCI state that corresponds to the default spatial relation (block 920). For example, the base station (e.g., using communication manager 150 and/or reception component 1302 depicted in FIG. 13) may receive the PUCCH communication using a TCI state that corresponds to the default spatial relation, as described above, for example, with reference to FIGS. 3 and 5.

Process 900 may include additional aspects, such as any single aspect or any combination of aspects described below and/or in connection with one or more other processes described elsewhere herein.

In a first aspect, selecting the spatial relation as the default spatial relation includes selecting a spatial relation that corresponds to an active PDSCH TCI state with a lowest identifier in the active DL BWP.

In a second aspect, alone or in combination with the first aspect, the default spatial relation is selected further if the UE is configured to determine a default beam. That is, the spatial relation is selected when this condition and both conditions of block 910 are met, i.e., when the base station does not provide spatial relation information for the PUCCH, when the base station does not provide a CORESET in the active DL BWP, and when the UE is configured to determine a default beam.

In a third aspect, alone or in combination with one or more of the first and second aspects, the default spatial relation is selected further if the base station does not provide an indication of a PLRS in a PUCCH power control field. That is, the spatial relation is selected when this condition, the condition of the second aspect, and both conditions of block 910 are met, i.e., when the base station does not provide spatial relation information for the PUCCH, when the base station does not provide a CORESET in the active DL BWP, when the UE is configured to determine a default beam, and when the base station has not provided an indication of a PLRS in a PUCCH power control field.

In a fourth aspect, alone or in combination with one or more of the first through third aspects, process 900 includes configuring the UE for PUCCH carrier switching.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
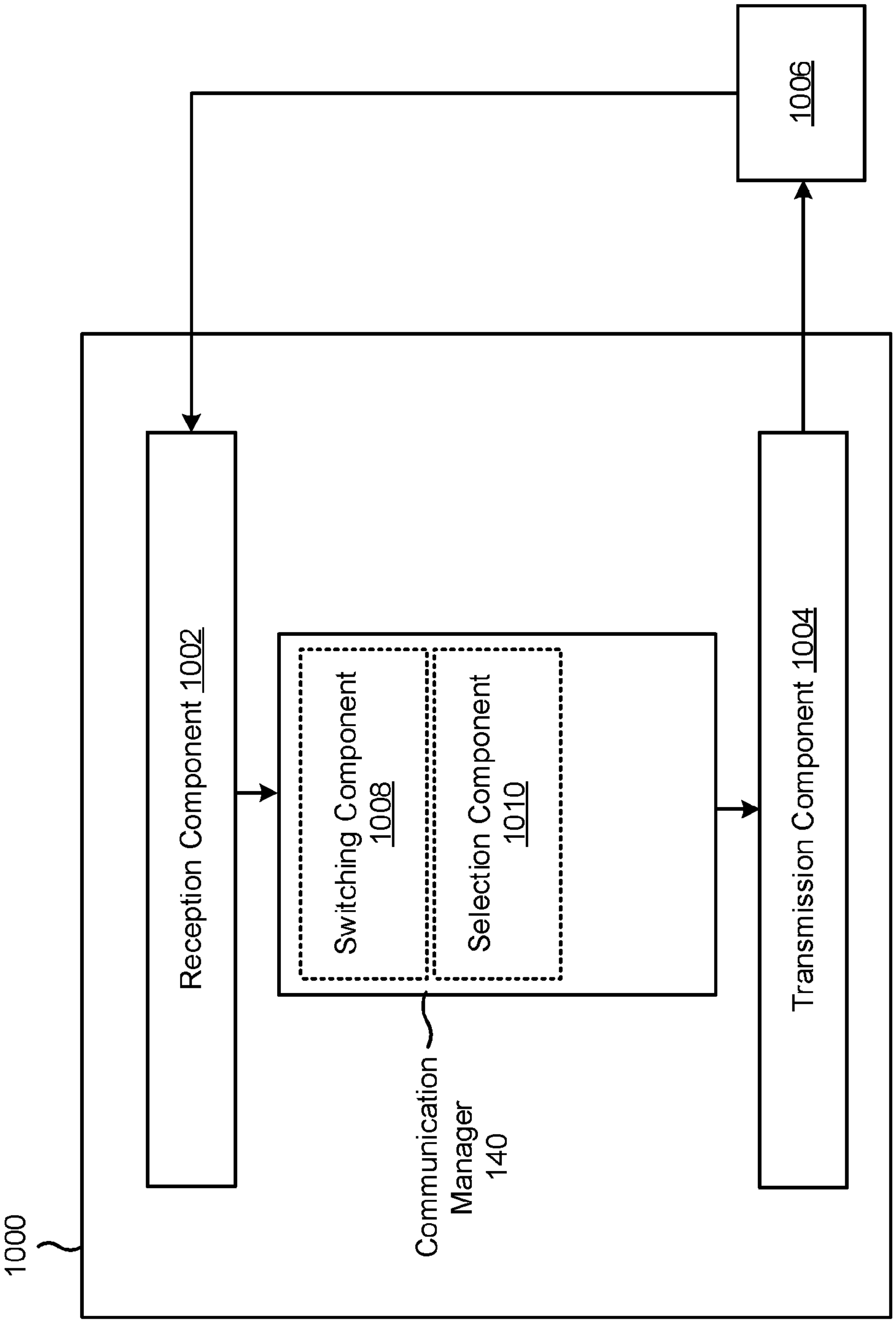
FIGS. 10-13 are diagrams of example apparatuses for wireless communication, in accordance with the present disclosure.

FIG. 10 is a diagram of an example apparatus 1000 for wireless communication. The apparatus 1000 may be a UE (e.g., a UE 120), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a switching component 1008 and/or a selection component 1010, among other examples.

In some aspects, the apparatus 1000 may be configured to perform one or more operations described herein in connection with FIGS. 1-5. Additionally, or alternatively, the apparatus 1000 may be configured to perform one or more processes described herein, such as process 600 of FIG. 6. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples) and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples) and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver. The switching component 1008 may switch carriers for the PUCCH.

The selection component 1010 may select, as a default PLRS, an RS resource that corresponds to an active PDSCH TCI state of an active DL BWP if the UE does not receive an indication of a PLRS and if a CORESET is not provided in the active DL BWP. The reception component 1002 may receive the default PLRS in association with a PUCCH.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
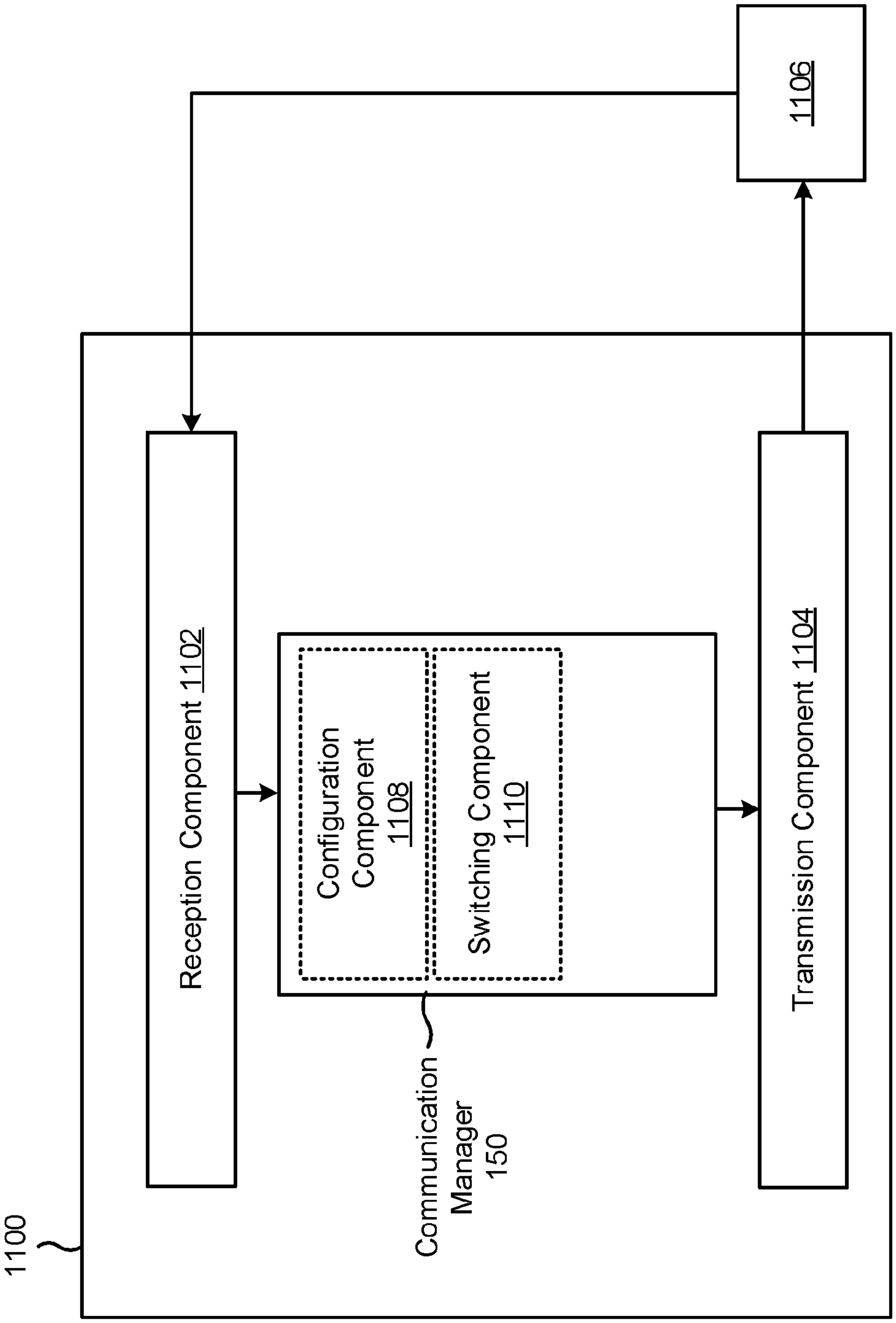

FIG. 11 is a diagram of an example apparatus 1100 for wireless communication. The apparatus 1100 may be a base station (e.g., base station 110), or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a configuration component 1108 and/or a selection component 1110, among other examples.

In some aspects, the apparatus 1100 may be configured to perform one or more operations described herein in connection with FIGS. 1-5. Additionally, or alternatively, the apparatus 1100 may be configured to perform one or more processes described herein, such as process 700 of FIG. 7. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples) and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples) and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver. The configuration component 1108 may configure the UE for PUCCH carrier switching.

The selection component 1110 may select, as a default PLRS for a UE, an RS resource that corresponds to an active PDSCH TCI state of an active DL BWP for the UE if the base station does not provide an indication of a PLRS to the UE and if the base station does not provide the UE a CORESET in the active DL BWP. The transmission component 1104 may transmit the RS resource to the UE as the default PLRS.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
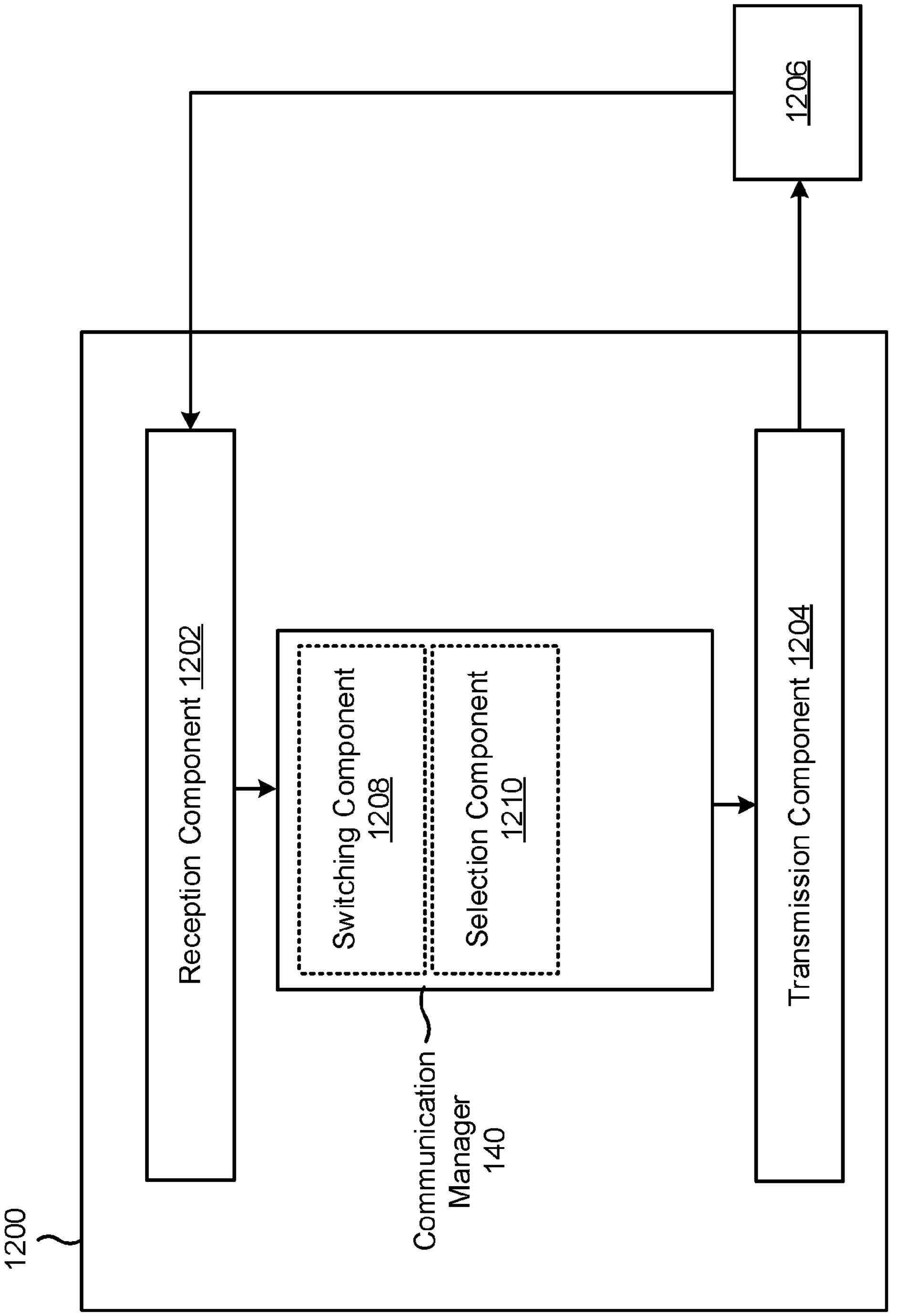

FIG. 12 is a diagram of an example apparatus 1200 for wireless communication. The apparatus 1200 may be a UE (e.g., a UE 120), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a switching component 1208 and/or a selection component 1210, among other examples.

In some aspects, the apparatus 1200 may be configured to perform one or more operations described herein in connection with FIGS. 1-5. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples) and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples) and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver. The switching component 1208 may switch carriers for the PUCCH.

The selection component 1210 may select, as a default spatial relation for a PUCCH communication, a spatial relation that corresponds to an active PDSCH TCI state of an active DL BWP if the UE does not receive spatial relation information and if a CORESET is not provided in the active DL BWP. The transmission component 1204 may transmit the PUCCH communication using the spatial relation.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
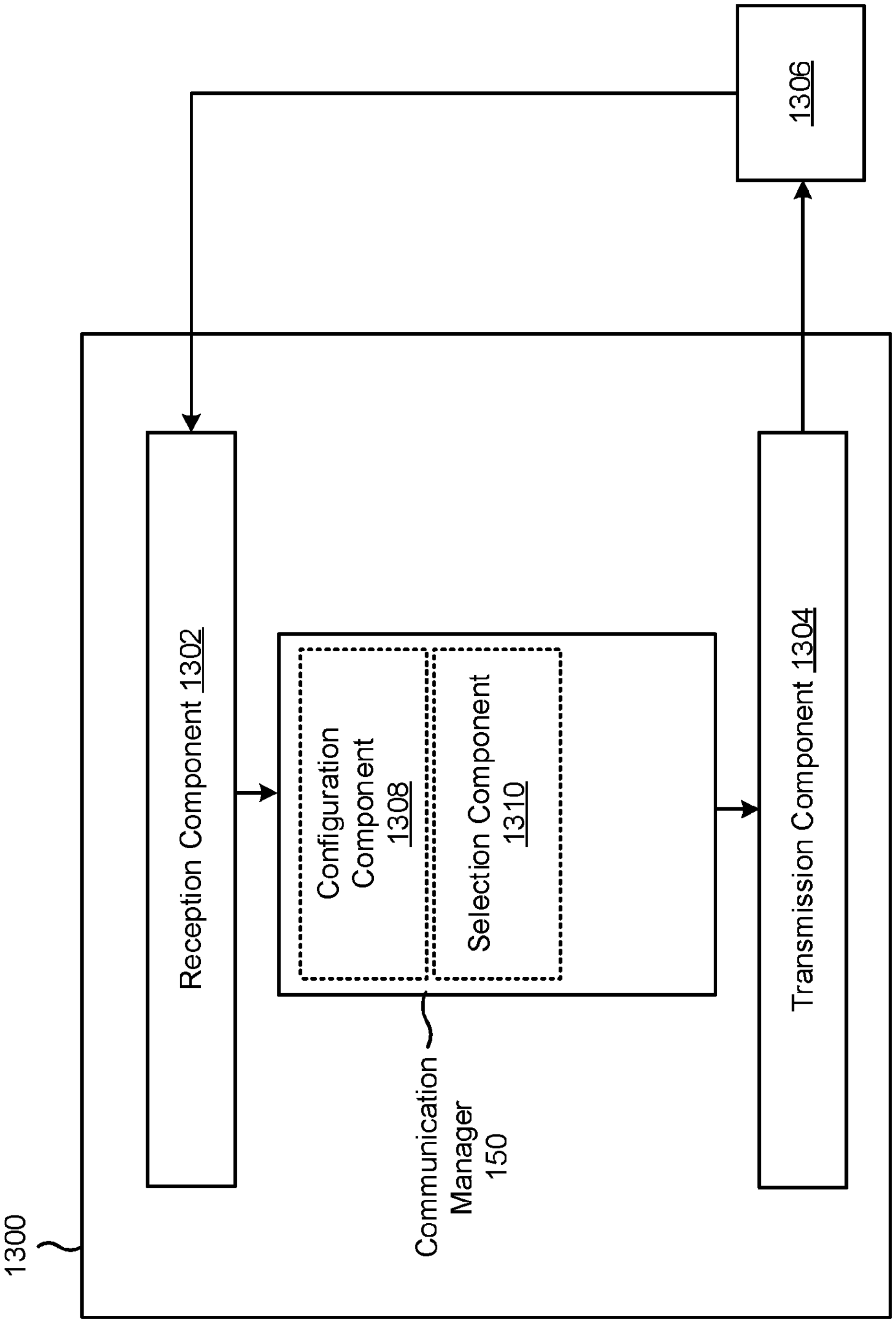

FIG. 13 is a diagram of an example apparatus 1300 for wireless communication. The apparatus 1300 may be a base station (e.g., base station 110), or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a configuration component 1308 and/or a selection component 1310, among other examples.

In some aspects, the apparatus 1300 may be configured to perform one or more operations described herein in connection with FIGS. 1-15. Additionally, or alternatively, the apparatus 1300 may be configured to perform one or more processes described herein, such as process 800 of FIG. 8. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples) and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples) and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver. The configuration component 1308 may configure the UE for PUCCH carrier switching.

The selection component 1310 may select, as a default spatial relation for a PUCCH communication, a spatial relation that corresponds to an active PDSCH TCI state of an active DL BWP if the base station does not provide spatial relation information for the PUCCH and if the base station does not provide a CORESET in the active DL BWP. The reception component 1302 may receive the PUCCH communication using a TCI state that corresponds to the default spatial relation.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: selecting, as a default path loss reference signal (PLRS), a reference signal (RS) resource that corresponds to an active physical downlink shared channel (PDSCH) transmission configuration indicator (TCI) state of an active downlink (DL) bandwidth part (BWP) if the UE does not receive an indication of a PLRS and if a control resource set (CORESET) is not provided in the active DL BWP; and receiving the default PLRS in association with a physical uplink control channel (PUCCH).

Aspect 2: The method of Aspect 1, wherein selecting the RS resource as the default PLRS includes selecting an RS resource index that provides a periodic RS resource that is configured with a quasi-co-location (QCL) Type D in the active PDSCH TCI state.

Aspect 3: The method of Aspect 1 or 2, wherein selecting the RS resource as the default PLRS includes selecting an RS resource that corresponds to an active PDSCH TCI state with a lowest identifier in the active downlink BWP.

Aspect 4: The method of any of Aspects 1-3, wherein the default PLRS is selected further if spatial relation information is not received for the PUCCH.

Aspect 5: The method of Aspect 4, wherein the default PLRS is selected further if the UE is configured to determine a default beam.

Aspect 6: The method of any of Aspects 1-5, further comprising switching carriers for the PUCCH.

Aspect 7: A method of wireless communication performed by a base station, comprising: selecting, as a default path loss reference signal (PLRS) for a user equipment (UE), a reference signal (RS) resource that corresponds to an active physical downlink shared channel (PDSCH) transmission configuration indicator (TCI) state of an active downlink (DL) bandwidth part (BWP) for the UE if the base station does not provide an indication of a PLRS to the UE and if the base station does not provide the UE a control resource set (CORESET) in the active DL BWP; and transmitting the RS resource to the UE as the default PLRS.

Aspect 8: The method of Aspect 7, wherein selecting the RS resource as the default PLRS includes selecting an RS resource index that provides the UE a periodic RS resource configured with a quasi-co-location (QCL) Type D in the active PDSCH TCI state.

Aspect 9: The method of Aspect 7 or 8, wherein selecting the RS resource as the default PLRS includes selecting an RS resource that corresponds to an active PDSCH TCI state with a lowest identifier in the active DL BWP.

Aspect 10: The method of any of Aspects 7-9, wherein the default PLRS is selected further if spatial relation information is not provided to the UE for a physical uplink control channel (PUCCH).

Aspect 11: The method of Aspect 10, wherein the default PLRS is selected further if the base station configured the UE to determine a default beam.

Aspect 12: The method of any of Aspects 7-11, further comprising configuring the UE for PUCCH carrier switching.

Aspect 13: A method of wireless communication performed by a user equipment (UE), comprising: selecting, as a default spatial relation for a physical uplink control channel (PUCCH) communication, a spatial relation that corresponds to an active physical downlink shared channel (PDSCH) transmission configuration indicator (TCI) state of an active downlink (DL) bandwidth part (BWP) if the UE does not receive spatial relation information and if a control resource set (CORESET) is not provided in the active DL BWP; and transmitting the PUCCH communication using the spatial relation.

Aspect 14: The method of Aspect 13, wherein selecting the spatial relation as the default spatial relation includes selecting a spatial relation that corresponds to an active PDSCH TCI state with a lowest identifier in the active DL BWP.

Aspect 15: The method of Aspect 13 or 14, wherein the default spatial relation is selected further if the UE is configured to determine a default beam.

Aspect 16: The method of any of Aspects 13-15, wherein the default spatial relation is selected further if the UE does not receive an indication of a path loss reference signal (PLRS) in a PUCCH power control field.

Aspect 17: The method of any of Aspects 13-16, further comprising switching carriers for the PUCCH.

Aspect 18: A method of wireless communication performed by a base station, comprising: selecting, as a default spatial relation for a physical uplink control channel (PUCCH) communication, a spatial relation that corresponds to an active physical downlink shared channel (PDSCH) transmission configuration indicator (TCI) state of an active downlink (DL) bandwidth part (BWP) if the base station does not provide spatial relation information for the PUCCH and if the base station does not provide a control resource set (CORESET) in the active DL BWP; and receiving the PUCCH communication using a TCI state that corresponds to the default spatial relation.

Aspect 19: The method of Aspect 18, wherein selecting the spatial relation as the default spatial relation includes selecting a spatial relation that corresponds to an active PDSCH TCI state with a lowest identifier in the active DL BWP.

Aspect 20: The method of Aspect 18 or 19, wherein the default spatial relation is selected further if the UE is configured to determine a default beam.

Aspect 21: The method of Aspect 20, wherein the default spatial relation is selected further if the base station does not provide an indication of a path loss reference signal (PLRS) in a PUCCH power control field.

Aspect 22: The method of any of Aspects 18-21, further comprising configuring the UE for PUCCH carrier switching.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

switch, based on a dynamic indication or a semi-static configuration, from an initial carrier to a switched-to carrier for transmitting a physical uplink control channel (PUCCH) communication, the switched-to carrier having no corresponding control resource set (CORESET);

select, as a default path loss reference signal (PLRS), a reference signal (RS) resource that corresponds to an active physical downlink shared channel (PDSCH) transmission configuration indicator (TCI) state of an active downlink (DL) bandwidth part (BWP) if the UE does not receive an indication of a PLRS, and if the CORESET is not provided in the active DL BWP; and receive the default PLRS in association with a physical uplink control channel (PUCCH).

2. The UE of claim 1, wherein the one or more processors, to select the RS resource as the default PLRS, are configured to select an RS resource index that provides a periodic RS resource that is configured with a quasi-co-location (QCL) Type D in the active PDSCH TCI state.

3. The UE of claim 1, wherein the one or more processors, to select the RS resource as the default PLRS, are configured to select an RS resource that corresponds to an active PDSCH TCI state with a lowest identifier in the active downlink BWP.

4. The UE of claim 1, wherein the one or more processors are configured to select the default PLRS further if spatial relation information is not received for the PUCCH.

5. The UE of claim 4, wherein the one or more processors are configured to select the default PLRS further if the UE is configured to determine a default beam.

6. A network entity for wireless communication, comprising:

one or more memories; and one or more processors, coupled to the one or more memories, configured to:

switch, based on a dynamic indication or a semi-static configuration, from an initial carrier to a switched-to carrier for transmitting a physical uplink control channel (PUCCH) communication, the switched-to carrier having no corresponding control resource set (CORESET);

select, as a default path loss reference signal (PLRS) for a user equipment (UE), a reference signal (RS) resource that corresponds to an active physical downlink shared channel (PDSCH) transmission configuration indicator (TCI) state of an active downlink (DL) bandwidth part (BWP) for the UE if the network entity does not provide an indication of a PLRS to the UE, and if the network entity does not provide the UE the CORESET in the active DL BWP; and transmit the RS resource to the UE as the default PLRS.

7. The network entity of claim 6, wherein the one or more processors, to select the RS resource as the default PLRS, are configured to select an RS resource index that provides the UE a periodic RS resource configured with a quasi-co-location (QCL) Type D in the active PDSCH TCI state.

8. The network entity of claim 6, wherein the one or more processors, to select the RS resource as the default PLRS, are configured to select an RS resource that corresponds to an active PDSCH TCI state with a lowest identifier in the active DL BWP.

9. Network entity of claim 6, wherein the one or more processors are configured to select the default PLRS further if spatial relation information is not provided to the UE for a physical uplink control channel (PUCCH).

10. The network entity of claim 9, wherein the one or more processors are configured to select the default PLRS further if the network entity configured the UE to determine a default beam.

11. A user equipment (UE) for wireless communication, comprising:

one or more memories; and one or more processors, coupled to the one or more memories, configured to:

switch, based on a dynamic indication or a semi-static configuration, from an initial carrier to a switched-to carrier for transmitting a physical uplink control channel (PUCCH) communication, the switched-to carrier having no corresponding control resource set (CORESET);

select, as a default spatial relation for a physical uplink control channel (PUCCH) communication, a spatial relation that corresponds to an active physical downlink shared channel (PDSCH) transmission configuration indicator (TCI) state of an active downlink (DL) bandwidth part (BWP) if the UE does not receive spatial relation information, and if the CORESET is not provided in the active DL BWP; and transmit the PUCCH communication using the spatial relation.

12. The UE of claim 11, wherein the one or more processors, to select the spatial relation as the default spatial relation, are configured to select a spatial relation that corresponds to an active PDSCH TCI state with a lowest identifier in the active DL BWP.

13. The UE of claim 11, wherein the one or more processors are configured to select the default spatial relation further if the UE is configured to determine a default beam.

14. The UE of claim 13, wherein the one or more processors are configured to select the default spatial relation further if the UE does not receive an indication of a path loss reference signal (PLRS) in a PUCCH power control field.

15. A network entity for wireless communication, comprising:

one or more memories; and one or more processors, coupled to the one or more memories, configured to:

switch, based on a dynamic indication or a semi-static configuration, from an initial carrier to a switched-to carrier for transmitting a physical uplink control channel (PUCCH) communication, the switched-to carrier having no corresponding control resource set (CORESET);

select, as a default spatial relation for a physical uplink control channel (PUCCH) communication with a user equipment (UE), a spatial relation that corresponds to an active physical downlink shared channel (PDSCH) transmission configuration indicator (TCI) state of an active downlink (DL) bandwidth part (BWP) if the network entity does not provide spatial relation information for the PUCCH, and if the network entity does not provide the CORESET in the active DL BWP; and receive the PUCCH communication using a TCI state that corresponds to the default spatial relation.

16. The network entity of claim 15, wherein the one or more processors, to select the spatial relation as the default spatial relation, are configured to select a spatial relation that corresponds to an active PDSCH TCI state with a lowest identifier in the active DL BWP.

17. The network entity of claim 15, wherein the one or more processors are configured to select the default spatial relation further if the UE is configured to determine a default beam.

18. The network entity of claim 17, wherein the one or more processors are configured to select the default spatial relation further if the network entity does not provide an indication of a path loss reference signal (PLRS) in a PUCCH power control field.

* * * * *